UNITED STATES PATENT OFFICE.

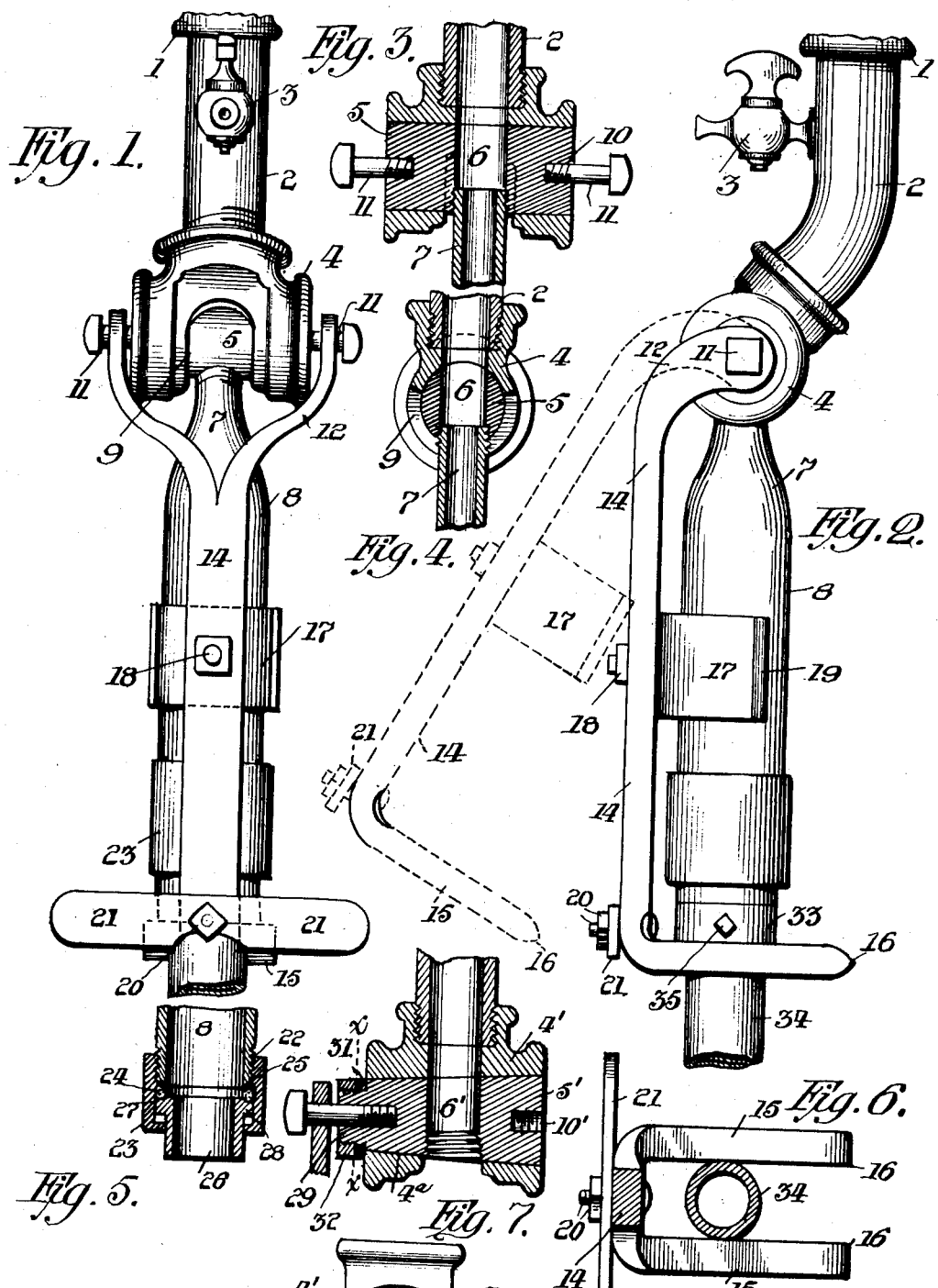

JOHN P. McCANN, OF ARNOLD, PENNSYLVANIA, ASSIGNOR TO WINDOW GLASS MACHINE COMPANY, OF PITTSBURG, PENNSYLVANIA, A CORPORATION OF NEW JERSEY.

FLEXIBLE PIPE CONNECTION.

No. 833,408.  Specification of Letters Patent.  Patented Oct. 16, 1906.

Application filed March 14, 1904. Renewed March 29, 1906. Serial No. 308,739.

*To all whom it may concern:*

Be it known that I, JOHN P. MCCANN, a citizen of the United States of America, residing at Arnold, in the county of Westmoreland and State of Pennsylvania, have invented certain new and useful Improvements in Flexible Pipe Connections, of which the following is a specification, reference being had therein to the accompanying drawings.

This invention has relation to flexible pipe connections, and has for its object to provide a flexible connection for pipes which will be particularly adapted for use in connection with glass-blowing machines.

Heretofore and before my invention was put into practice a rubber hose has been used in connection with glass-blowing machines to connect a movable pipe with a stationary pipe, and great trouble has been experienced in this rubber hose becoming worn, cracked, and unfit for service after a very short period of use, the above condition of the hose permitting of the leakage of air, which is detrimental to the process of blowing glass.

In glass-blowing machines the air is fed to the machine by telescoping pipes to which one end of a rubber hose has been attached, the other end of the rubber hose being attached to a movable blowpipe which leads into the pot of glass; and it is the main object of my invention to construct a flexible joint between this telescopic pipe and the blowpipe, the joint being so constructed that the two pipes may be broken apart or detached at any time it is desired, and the many other advantages will be apparent from the following description, taken in connection with the drawings.

In the accompanying drawings, like numerals of reference indicate like parts throughout the several views of the drawings, in which—

Figure 1 is a front elevation of my improved flexible connection. Fig. 2 is a side elevation of the flexible pipe connection, showing the supporting-arm in an extended position in dotted lines. Fig. 3 is a vertical sectional view of the flexible connection. Fig. 4 is a vertical cross-sectional view of the flexible connection illustrated in Fig. 3 of the drawings. Fig. 5 is a vertical sectional view of one of the attachments of my improved flexible pipe connections. Fig. 6 is a cross-sectional view of the supporting-arm, showing the forked end thereof. Fig. 7 is a vertical longitudinal sectional view of a modified form of flexible connection. Fig. 8 is a cross-sectional view taken on the line *x x* of Fig. 7, with the elbow-pipe removed.

In the accompanying drawings, the reference-numeral 1 designates the end of the ordinary telescopic pipe now generally used in connection with glass-blowing machines, and connected to the end of this pipe is an elbow-pipe 2, in the front side of which I mount a cock 3. The object thereof will be hereinafter more fully described.

Threaded upon the end of the elbow-pipe 2 is a T-shaped pipe or union 4, in which is mounted longitudinally of its length a plug 5, this plug being similar in construction to an ordinary plug-valve. The plug 5 is provided with an aperture 6, into which is threaded the contracted end 7 of a pipe 8, the T-shaped pipe 4 having a slot 9 formed in the lower side of its body to permit the securing of the contracted end 7 of the pipe 8 to the plug 5, the slot 9, extending two-thirds of the distance around the horizontal portion of the T-shaped pipe, whereby the plug 5 may be rotated therein, thus providing a flexible connection between the elbow-shaped pipe 2 and the pipe 8. In each end of the plug 5 is provided a threaded aperture 10, into which is secured a screw-threaded bolt 11, and supported upon these screw-threaded bolts are the arms 12 of the bifurcated supporting-arm 14. This arm 14 extends downwardly a short distance and is again bifurcated, forming a fork, the prongs 15 of the said fork extending at right angles to the supporting-arm 14, the outer ends of the prongs being tapered, as indicated at 16. Centrally of the length of the supporting-arm 14 I secure a U-shaped spring 17, this spring being secured to the rear side of the supporting-arm 14 by a bolt and nut, at at 18, the ends of the U-shaped spring 17 being rolled, as indicated at 19, and this spring 17 is employed to grip the pipe 8 and hold the same in vertical alinement with the supporting-arm 14. Upon the front side of the supporting-arm 14 and preferably near the lower end thereof I secure by bolt and nut, as at 20, a cross-arm 21, which provides means whereby the supporting-arm may be gripped and forced out to a position shown in dotted lines in Fig. 2 of the drawings.

The lower end of the pipe 8 is threaded, as designated by the reference-numeral 22, and upon this threaded end is secured a flanged sleeve 23. Prior to securing this sleeve 23 upon the threaded end 22 of the pipe 8 a packing 24 is placed within the groove 25, formed in the end of the pipe 8. This packing is supported in the groove 25 by a flanged sleeve 26, a groove 27 being formed in the end of the pipe and the flanged portion 28 thereof.

In Fig. 7 of the drawings I have illustrated a modified form of construction of the flexible connection shown in Figs. 3 and 4 of the drawings, this modified form consisting of a T-shaped pipe 4', which is similar in construction to the T-shaped pipe illustrated in Figs. 3 and 4, with the exception that the longitudinally-formed opening in the horizontal portion of this pipe is made tapered, as designated at 4ª, and into this tapered opening is placed a tapered plug 5', which has an aperture 6', similar to the aperture 6 of the plug 5. The tapered plug 5' has formed integral with its smallest end a threaded annular projection 29, and one side of this threaded annular projection is cut away, as indicated at 30, forming a flattened surface, and upon the projection 29 is placed a washer 31, which is held from rotation upon the projection 29 by the flattened surface 30 thereof, and secured on the threaded end of the projection 29 is a jam-nut 32. By this construction it will be readily seen that the tapered plug 5' can be drawn farther into the T-shaped pipe 4' to afford an air-tight connection between the pipe 2 and the pipe 8. The ends of the tapered plug 5' are provided with threaded apertures 10', in which are secured threaded bolts similar to the bolts used in the preferred form of construction, and upon these bolts is supported the supporting-arm 14. When the elbow-shaped pipe 2 has been secured to the end of the telescopic pipe 1 and it is desired to connect the blowpipe of the glass-blowing machine thereto, a collar 33 is secured upon the end of the blowpipe 34 by a set-screw 35, and the prongs 15 of the forked end of the arm 14 are placed under the edge of the collar 33, the prongs 15 spanning the blowpipe 34, and when the supporting-arm 14 is thrown from the position in dotted lines shown in Fig. 2 to the position in full line of the same figure the top edge of the collar 33 will engage with the bottom edge of the sleeve 26, as clearly illustrated in Fig. 2 of the drawings. When it is desired to disconnect the two pipes 8 and 34, respectively, the arm 14 is forced outwardly by striking the cross-arm 21. This movement will disengage the collar 33 from the sleeve 26, and the blowpipe 34 may be removed from the forks of the supporting-arm 14.

In the operation of glass-molding machines considerable trouble has been experienced by reason of an excess amount of air passing through the blowpipe. It has generally been the practice to obviate this by providing the elbow-pipe (similar to pipe 2 in my device) with a small opening normally closed in a crude manner, such as by a wooden plug, and when the air-pressure would exceed the certain pressure required during the blowing process this plug would be removed to permit the air to escape. In my device I have dispensed with this crude method and provide the elbow-pipe 2 with a cock 3, as shown in Figs. 1 and 4, which may be readily opened and closed, as desired. Further, blowpipes as used with glass-molding machines are subjected to great heat, which oftentimes causes irregularities to be formed on the end of the blowpipe due to the shrinking or distorting of the pipe under the action of the heat. To obviate this, I provide the sleeves 23 26, and in case the blowpipe 34 becomes shrunken or distorted, and thereby made irregular on its end, so as to prevent a close fitting with the coupling, I can file off the end of pipe 34 to make it smooth and fit neatly with sleeve 26, the sleeve 23 providing for the loss of material on end of pipe 34, enabling me to dispense with different lengths of stem-pipes 8.

It will be apparent from the above description, taken in connection with the drawings, that many other advantages exist which will be readily seen by those skilled in the art, and while I have herein shown and described a construction which is particularly adapted for a flexible pipe connection of this character it will be observed that I may make various changes in the details of construction without departing from the general spirit and scope of my invention.

What I claim as my invention is—

1. In a device of the character described, the combination of a T-shaped pipe having a slot formed in its lower side, a plug mounted in said pipe, an elbow-pipe secured in the upper part of said T-shaped pipe, a pipe secured in said plug, said pipe communicating with the elbow-pipe through said plug, means carried by said plug for supporting a pipe against the lower end of the pipe engaging in the plug.

2. In a device of the character described, the combination with a T-shaped pipe having a slot formed in its lower side, a plug mounted within said pipe, and an elbow-pipe mounted in said T-shaped pipe, of a pipe secured in said plug and communicating with the elbow-pipe, a supporting-arm carried by said plug, means carried by said arm for supporting a pipe in engagement with the pipe engaging in said plug, and means carried by said arm for holding said pipes in alinement.

3. A device of the character described, comprising a T-shaped pipe having a slot formed in its lower face, a pipe mounted in its upper face a plug mounted in said T-shaped pipe, and having an aperture formed therein, a pipe secured in said aperture, and means carried by said plug for supporting a pipe in engagement with the first-mentioned pipe.

4. A device of the character described, comprising a T-shaped pipe having a slot formed in its body portion, a pipe secured in said T-shaped pipe, a plug rotatably mounted within said T-shaped pipe, said plug having an aperture formed therein, a pipe secured within said aperture and communicating with the first-named pipe, a supporting-arm pivotally connected to said plug, means carried by the lower end of said arm for supporting a pipe in engagement with the second-named pipe, and means carried by said arm for holding said last-named pipe in alinement with said second-named pipe.

5. A flexible pipe connection comprising a T-shaped pipe, said pipe having a slot formed therein, an elbow-pipe secured in said T-shaped pipe, a plug rotatably mounted within the horizontal portion of said T-shaped pipe, said plug having an aperture formed therein, a pipe secured in said aperture and communicating with the elbow-pipe, a supporting-arm pivotally mounted to said plug, means carried by the lower end of said arm for supporting a pipe in engagement with the first-named pipe, means carried by said arm for holding the first-named pipe in alinement with said second-named pipe, and a cock carried by the elbow-pipe.

6. A flexible pipe connection for glass-blowing machines, comprising a T-shaped pipe, an elbow-pipe secured in the upper part of said T-shaped pipe, a cock carried by said elbow-pipe, said T-shaped pipe having a slot formed in its horizontal portion, a plug rotatably mounted within said T-shaped pipe, said plug having an aperture formed therein, a pipe secured in said aperture and communicating with the elbow-pipe, an arm pivotally connected to said plug, the lower end of said arm being bifurcated and adapted to support a pipe, and a spring carried by said arm and adapted to hold the first-named pipe in alinement with second-named pipe, substantially as described.

7. A flexible pipe connection for glass-blowing machines, comprising a T-shaped pipe having a slot formed therein, a pipe carried by said T-pipe, a plug mounted in said T-pipe, a pipe carried by said plug and means carried by said plug for supporting a pipe, substantially as described.

8. A flexible pipe connection for glass-blowing machines, comprising two sections of pipe, means for pivotally connecting said pipe together and means carried by the first-named means to support a pipe in engagement with one of the first-named pipes.

9. A flexible pipe connection for glass-blowing machines, comprising two sections of pipe hinged together and in communication with each other, means carried by one of said pipes for supporting a pipe in communication with one of the first-named pipes, In testimony whereof I affix my signature in the presence of two witnesses.

JOHN P. McCANN.

Witnesses:
  Wm. E. King,
  K. H. Butler.